United States Patent [11] 3,552,500

| [72] | Inventor | Carl R. Peterson<br>Princeton, N.J. |
|---|---|---|
| [21] | Appl. No. | 750,969 |
| [22] | Filed | Aug. 7, 1968 |
| [45] | Patented | Jan. 5, 1971 |
| [73] | Assignee | Ingersoll-Rand Company<br>New York City, N.Y.<br>a corporation of New Jersey |

[54] HYDRAULIC DRILL
5 Claims, 8 Drawing Figs.

[52] U.S. Cl. .................................................. 173/105, 175/296
[51] Int. Cl. .................................................. E21b 1/10
[50] Field of Search .................................................. 173/105, 123, 116; 175/107, 296, 293

[56] References Cited
UNITED STATES PATENTS

| 2,641,445 | 6/1953 | Snyder | 175/296X |
| 2,836,395 | 5/1958 | Bielstein | 175/296X |
| 3,096,833 | 7/1963 | Bodine | 175/107X |
| 3,191,693 | 6/1965 | Lincoln | 173/105X |

Primary Examiner—Nile C. Byers, Jr.
Attorneys—Carl R. Horten and David W. Tibbott ABSTRACT: A hydraulic drill containing a reciprocating piston driven by a pair of hydraulic fluid columns. Impulses are applied alternately to the pair of fluid columns by a pump located in the drill and driven by a motor also located in the drill.

PATENTED JAN 5 1971

3,552,500

INVENTOR.
CARL R. PETERSON
BY
David W. Tillson
ATTORNEY

HYDRAULIC DRILL

BACKGROUND OF INVENTION

This invention relates to a drill operated by hydraulic fluid and more particularly to a drill containing a reciprocating piston driven by hydraulic fluid.

SUMMARY OF INVENTION

The principal object of this invention is to provide a novel drill operated by hydraulic fluid.

Other important objects are: to provide a drill containing a reciprocating piston driven by a pulsating column of hydraulic fluid which is created inside of the drill housing; to provide a drill driven by a pulsating column of hydraulic fluid which is not subject to the disadvantages of being connected to a remote source of pulsating hydraulic pressure; to provide a drill containing a pulsating column of hydraulic fluid to drive a reciproacting piston; and to provide a drill containing a reciprocating piston operated by a pair of alternately pulsing columns of hydraulic fluid.

In general, the foregoing objects are provided in a drill containing a reciprocating piston driven by a pair of hydraulic fluid columns, a pump for applying impulses alternately to the pair of hydraulic fluid columns and a motor for driving the pump. Placing the pump inside of the drill casing eliminates the problems inherent with the use of hoses interconnecting the drill and the pump. In addition, the pump can be arranged to provide the drill bit with combined rotary and axial movements which can automatically vary in accordance with the drilling conditions encountered by the drill bit.

BRIEF DESCRIPTION OF DRAWINGS

The invention is described in connection with the accompanying drawing wherein.

DESCRIPTION OF PREFERRED EMBODIMENT

Figure 2A:
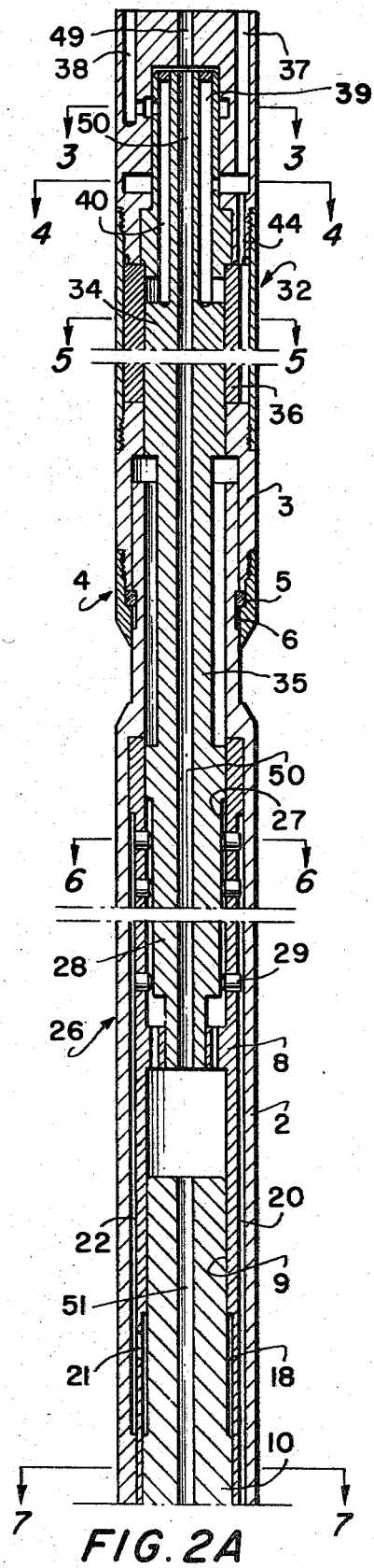
FIG. 2A is an enlarged axial section of the upper portion of the drill in FIG. 1 taken on the line 2–2 in FIG. 6.
Figure 2B:
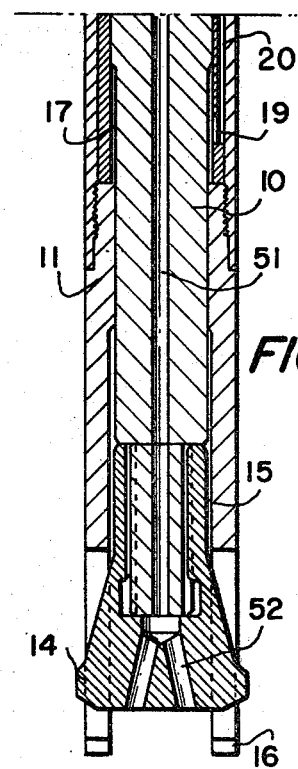
FIG. 2B is an enlarged section of the lower portion of the drill in FIG. 1 and is broken away from the portion shown in FIG. 2A.
Figure 1:
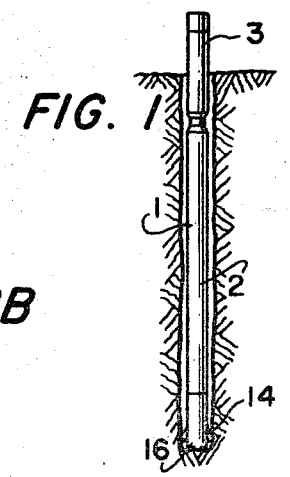
FIG. 1 is an elevational view of a downhole drill embodying this invention.
Figure 3:
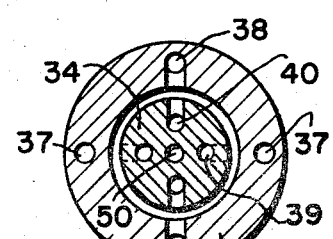
FIGS. 3 to 7 are cross sections taken on respective line 3–3, 4–4, 5–5, 6–6, and 7–7 of FIG. 2A.

The drill 1 shown in FIG. 1 is of the "downhole" type which means that the drill motor travels with the drill bit down the hole being drilled. However, it is emphasized that the invention can also be used with a conventional drill wherein the drill motor remains above the ground surface.

The drill 1 includes a cylindrical casing composed of a forward casing section 2 and a rear casing section 3. The forward casing section 2 is connected to the rear casing section 3 by a joint 4 which allows the front casing section 2 to rotate relative to the rear section 3 and to slide relative to the rear section 3 over a short limited distance. The joint 4 includes a split ring 5 engaging an annular groove 6 formed in the periphery of the forward casing section 2 and attached to the front portion of the rear section 3 by a threaded cap.

The forward casing section 2 slidably receives an inner body 8 which contains a cylindrical bore 9 in its forward portion. A reciprocating piston 10 is slidably housed in the bore 9 and projects from the front end of the bore 9. A threaded chuck 11 is attached to the front end of the forward casing section 2 and holds the inner body 8 in place in the drill casing. The front end of the piston 10 is removably fastened to a drill bit 14 whereby the drill bit 14 reciprocates with the piston 10. This type of drill is referred to as a "thrown bit" drill. However, this invention can also be used in a percussion bit drill wherein the piston 10 impacts the bit.

The chuck 11 contains longitudinal flutes 15 adapted to receive cooperating splines on the drill bit 14 to key the drill bit 14 to the drill casing. Three feet 16 are attached to the front end of the chuck 11 to support the bit 14 a short distance above the bottom of the hole being drilled to enable it to drill more effectively.

Figure 6:
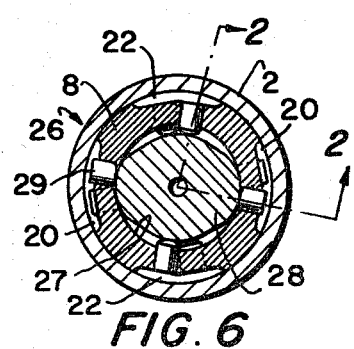
Figure 4:
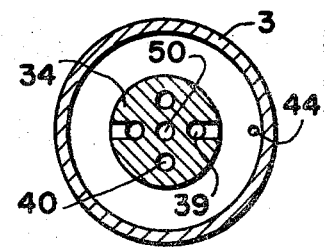
Figure 7:
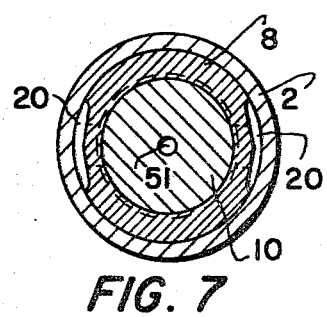

The bore 9 and piston 10 include cooperating shoulders and undercut annular grooves forming respective forward and rear chambers 17 and 18 for receiving hydraulic fluid to reciprocate the piston 10. Hydraulic fluid flows to and from the front chambers 17 through a pair of ports 19 and a pair of passages 20, while fluid flows to and from the rear chamber 18 through a pair of ports 21 and a pair of rear passages 22. The passages 20 and 22 are provided by forming longitudinal grooves in the circumference of the inner body 8. FIG. 6 shows that each passage in each pair of passages 20 and 22 is located diametrically relative to its mating passage and that each pair is space 90° from the other pair of passages.

The pump 26 which applies alternate impulses to the passages 20 and 22 is located within the inner body 8 immediately to the rear of the reciprocating piston 10. The inner body 8 includes a rear portion containing a pump bore 27 enclosing a rotary cam 28 which has a cross section approximating an ellipse. The bore 27 is divided into four quadrants with each quadrant containing a series of small radially sliding pistons 29 slidably mounted in the bore wall and extending into the passages 20 and 22 located on the circumference of the inner body 8. The passages 20 and 22 are located at right angles to each other so that the rotating cam 28 will create alternate impulses in the passages 20 and 22 by pushing the respective pistons 29 alternately outward. The cam 28 is mounted to slide axially in the pump bore 27 to accommodate the relative sliding movements of the casing sections 2 and 3 in the joint 4.

The rear casing section 3 contains a fluid-operated rotary motor 32 directly coupled to the pump 26. The motor 32 includes a motor bore 33 formed in the rear casing section 3 and housing a motor rotor 34. The motor rotor 34 is integrally coupled to the pump cam 28 by a shaft 35 and is slidably mounted in the motor bore 33. The motor rotor 34 approximates a ellipse in cross section and is engaged by a plurality of stationary radial vanes 36 slidably mounted in the rear casing section 3.

The motor 32 is operated by a supply of fluid delivered through a supply pipe (not shown) connected to the rear end of the drill. The rear casing section 3 includes an inlet passage 37 and an exhaust passage 38. Both of the passages 37 and 38 are connected to respective conduits 39 and 40 extending longitudinally through the rear portion of the rotor 34. The inlet conduit 39 extends forward to a pair of inlet ports 41 which are located at diametrically opposed positions and open radially outward into the crescent-shaped chambers 43 formed between the elliptical rotor 34 and the motor bore 33. The rotor also contains a pair of diametrically located exhaust ports 42 connected to the rotor exhaust conduit 39 for removing the operating fluid from the motor 32 after it has expanded.

The inlet passage 37 is connected by a passage 44 to the space behind the vanes 36 to utilize the fluid pressure in the inlet passage 37 to urge the vanes 36 radially inward against the elliptical rotor 34.

Figure 5:
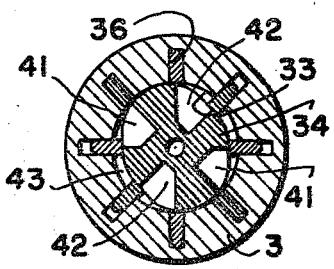

Looking at FIG. 5, the rotor 34 rotates clockwise and the fluid flows into the crescent-shaped actuating chambers 43 from the inlet ports 41. This fluid pressure attempts to expand and, thus, cooperate with the vanes 36 to urge the rotor 34 in a clockwise direction. Soon after the inlet ports 41 are closed by a vane 36, the exhaust ports 42 arrive to drain the fluid from the chambers 43.

A passage for air extends axially throughout the length of the drill 1 to conduct air to the bit 14 for hole cleaning purposes. This passage includes an axial passage 49 at the rear of the drill 1, a rotor passage 50 extending the length of the motor rotor 34, the shaft 35 and the pump cam 28, a piston passage 51 extending through the piston 10, and a pair of bit ports 52 opening through the bit 14 into the bottom of the hole being drilled.

The drill is operated by feeding hydraulic pressure fluid down a pipeline or drill string connected to the rear end of the drill into the inlet passages 37, through the inlet rotor conduits 39 and the inlet ports 41. As the motor rotor 34 is rotated by the fluid pressure, the fluid is exhausted from the motor 32 through the exhaust ports 42, the exhaust rotor conduits 40 and the exhaust passages 38.

As the motor 32 rotates, it drives the pump cam 28 at the same speed, due to the interconnecting shaft 35 which connects the motor rotor 34 and pump cam 28 together. The rotation of the pump cam 28 may result in either of two actions. Either the entire forward casing section 2 of the drill may rotate or if the forward casing section 2 is held against rotation, the drill piston 10 will reciprocate. In actual practice, the drill will simultaneously produce a combination of these two motions.

If we assume that the forward casing section 2 is prevented from rotating freely by frictional engagement of the casing with the sides of the hole being drilled, the drill piston will be reciprocated by a series of impulses applied by the pump 26 alternately to the hydraulic fluid enclosed in the front and rear passages 20 and 22. Impulses supplied alternately to the columns of fluid in the passages 20 and 22 will result in alternate impulses created in the piston chambers 17 and 18, causing the piston 10 to reciprocate forwardly and rearwardly. The reciprocation of the piston 10 will carry the bit 14 with it and drill a hole in the usual way for a "thrown bit" type of drill.

Although a single embodiment of the invention is illustrated and described in detail, it will be understood that the invention is not limited simply to this embodiment, but contemplates other embodiments and variations which utilize the concepts and teachings of this invention.

I claim:
1. A drill of the reciprocating type and comprising:
   an elongated drill casing including forward and rear sections rotatably interconnected;
   a reciprocating piston slidably mounted in a cylinder longitudinally oriented in the forward casing section;
   a drilling implement slidably mounted in one end of said forward casing section and operatively associated with said piston for cooperating therewith during a drilling operation;
   a rotary fluid pump in said forward casing section and operatively associated therewith to create a pulsing column of fluid;
   passage means in said forward section to convey said pulsing column of fluid to said piston to cause it to reciprocate; and
   rotary motor means in said rear casing section operatively connected to said pump whereby the driving of said pump can simultaneously rotate said forward casing section and reciprocate said drill piston.

2. A drill of the reciprocating type and comprising:
   an elongated casing including a forward section and a rear section with the forward section being rotatably and slidably connected to the rear section;
   said forward section containing a longitudinally oriented cylinder;
   a reciprocating piston slidably mounted in said cylinder;
   a drilling implement slidably mounted in one end of said forward section of said casing and operatively associated with said piston for cooperating therewith during a drilling operation;
   a rotary fluid pump in said forward section and operatively associated therewith to create a pair of pulsing columns of hydraulic fluid which are pulsed in alternate fashion;
   said pump being d located in said forward section of said casing immediately rearward of said piston;
   passages in said forward section extending from said pump to the opposite ends of said piston for conveying said pulsing columns of hydraulic fluid to alternate ends of said piston for driving it in alternate direction; and
   a motor located in said rear section of said casing and directly coupled to said pump so that both rotate together at the same speed.

3. The drill of claim 2 wherein:
   said pump includes a plurality of radially reciprocating pump pistons actuated by a rotary cam.

4. The drill of claim 3 wherein:
   said rotary cam is slidable axially relative to said pump pistons.

5. The drill of claim 4 wherein:
   said motor is driven by fluid pressure.